United States Patent
Mazzocco

(10) Patent No.: US 11,760,157 B2
(45) Date of Patent: Sep. 19, 2023

(54) AIR DUCT ASSEMBLY OF AIR DISTRIBUTION SYSTEM FOR A MOTOR VEHICLE

(71) Applicant: GM Global Technology Operations LLC, Detroit, MI (US)

(72) Inventor: Nicholas Mazzocco, Clawson, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 639 days.

(21) Appl. No.: 16/814,436

(22) Filed: Mar. 10, 2020

(65) Prior Publication Data
US 2021/0283980 A1 Sep. 16, 2021

(51) Int. Cl.
*B60H 1/24* (2006.01)
*B60H 1/00* (2006.01)
(Continued)

(52) U.S. Cl.
CPC ..... *B60H 1/00564* (2013.01); *B60H 1/00671* (2013.01); *B60H 1/00985* (2013.01);
(Continued)

(58) Field of Classification Search
CPC ............... B60H 1/00564; B60H 1/267; B60H 2001/006; B60H 1/00671; B60H 1/00985;
(Continued)

(56) References Cited

U.S. PATENT DOCUMENTS 5,274,201 A * 12/1993 Steele ................. F24F 13/24
181/267
6,244,335 B1 * 6/2001 Nakamura ......... B60H 1/00028
165/203

(Continued)

FOREIGN PATENT DOCUMENTS

DE 2200796 A1 7/1973
DE 202006006409 U1 7/2006

(Continued)

OTHER PUBLICATIONS

Arai, JP 4382549 B2 Espacenet Machine Translation, Dec. 16, 2009 (Year: 2009).*
English language abstract and machine-assisted English translation for JP4450264B2 extracted from www.Espacenet.org on Jul. 14, 2020; 6 pages.

*Primary Examiner* — Vivek K Shirsat
(74) *Attorney, Agent, or Firm* — Vivacqua Crane PLLC

(57) ABSTRACT

An air duct assembly for a vehicle air distribution system includes a first duct defining a first passage and a second duct defining a second passage separate from the first passage. The first and second passages are fluidly connected to a common outlet for flowing air to a windshield of the vehicle. The assembly further includes a third duct defining a third passage for flowing air to a side glass of the vehicle. The second and third passages are fluidly connected to a common inlet for receiving air from the blower motor. The third passage is fluidly connected to a lateral outlet that is separate from the common outlet, with the lateral outlet flowing air to a side glass of the vehicle. The assembly further includes at least one acoustic baffle disposed within the second passage and configured to reduce a transmission of the blower noise through the second passage.

19 Claims, 6 Drawing Sheets

(51) Int. Cl.
*B60H 1/26* (2006.01)
*B60H 1/34* (2006.01)

(52) U.S. Cl.
CPC .............. *B60H 1/267* (2013.01); *B60H 1/34* (2013.01); *B60H 2001/006* (2013.01); *B60H 2001/3478* (2013.01)

(58) Field of Classification Search
CPC .......................... B60H 1/34; B60H 2001/3478; B60H 1/0055; B60H 1/242; B60H 1/00507; B60H 1/00842; B60H 1/00028; B60H 2001/00192; B60H 2001/00135; B60H 1/00542; B60H 1/247; B60H 1/28; B60H 2001/00092; B60H 1/00528; B60H 1/00271; B60H 1/00295; F24F 11/43; F24F 2140/40; F24F 11/41; F24F 2013/242; B62D 25/142
USPC ........... 454/13, 130, 127, 124, 208; 296/208
See application file for complete search history.

(56) References Cited

U.S. PATENT DOCUMENTS

| | | | |
|---|---|---|---|
| 7,074,122 B2 | 7/2006 | Haupt et al. | |
| 8,813,908 B1 | 8/2014 | Liu et al. | |
| 2007/0227813 A1* | 10/2007 | Celik | F04D 29/664 |
| | | | 181/272 |
| 2017/0210197 A1* | 7/2017 | Lewczynski | B60H 1/00007 |
| 2018/0201087 A1* | 7/2018 | Soto | B60H 1/00564 |

FOREIGN PATENT DOCUMENTS

| | | |
|---|---|---|
| DE | 102015105555 A1 | 10/2016 |
| EP | 20040002482 B1 | 8/2004 |
| JP | H11129742 A | 5/1999 |
| JP | 2004314946 A | 11/2004 |
| JP | 2006335124 A | 12/2006 |
| JP | 4382549 B2 * | 12/2009 |
| JP | 4450264 B2 | 4/2010 |

* cited by examiner

AIR DUCT ASSEMBLY OF AIR DISTRIBUTION SYSTEM FOR A MOTOR VEHICLE

INTRODUCTION

The present disclosure relates to heating, ventilation, and air conditioning (HVAC) systems for motor vehicles, and more particularly to an air duct assembly that reduces the transmission of blower noise to a passenger cabin of the motor vehicle.

HVAC systems provide conditioned air to the passenger cabin, and typically include a module assembly that defines a mixing chamber. The mixing chamber combines heated air with cooled air which is output to various ducts and register vents of the vehicle. Examples of the various ducts include vehicle floor ducts, trim panel ducts, and window defrost ducts. A damper or door within the mixing chamber is positioned to direct the air to either the floor ducts, the trim ducts, the window defrost ducts, or a combination of the ducts depending on the selected mode of operation by a driver or passenger.

When operating the HVAC system in a floor-only mode position, the damper in the mixing chamber is left partially open to allow air to bleed from the mixing chamber directly to the window defrost duct. While this maintains a low flow of conditioned air directed at the windows even though defrost is not selected, noise generated in the mixing chamber can propagate from the highly turbulent mixing chamber directly to the window defrost duct where it can be heard by the driver and passengers of the vehicle. This noise is not typically an issue when the window defrost mode is selected since the full thrust of forced air departing the window defrost duct masks the noise of the mixing chamber. However, when floor-only mode is selected and the damper is left partially open, the result is undesirable noise propagating through the opening to the window defrost duct and then to the passenger cabin.

Thus, while existing HVAC systems and methods for distributing air within motor vehicles achieve their intended purpose, there is a need for a new and improved system and method for distributing air that addresses these issues.

SUMMARY

According to several aspects of the present disclosure, an air duct assembly for an air distribution system for a motor vehicle is provided. The motor vehicle includes a windshield, a side glass disposed laterally outboard from the windshield, and a floor pan spaced vertically downward from the windshield. The air distribution system includes a blower motor for producing a flow of air and an associated blower noise. The air duct assembly includes a first duct defining a first passage and second duct defining a second passage separate from the first passage. The first and second passages are fluidly connected to at least one common outlet for flowing air to the windshield. The air duct assembly further includes a third duct defining a third passage separate from the first and second passages. The second and third passages are fluidly connected to a common inlet for receiving air from the blower motor. The third passage is fluidly connected to a lateral outlet that is separate from the common outlet, with the lateral outlet flowing air to the side glass. The air duct assembly further includes at least one acoustic baffle disposed within the second passage and configured to reduce a transmission of the blower noise through the second passage to the windshield.

In one aspect, the first duct has a first inlet fluidly communicating with the blower motor, with the first inlet being separate from the common inlet.

In another aspect, the air duct assembly further includes a first door coupled to the first duct, with the first door being movable between a closed position for blocking the flow of air into the first inlet and an open position for directing the flow of air from the blower motor into the first inlet.

In another aspect, the air duct assembly further includes a first actuator coupled to the first door for moving the first door between the closed and open positions.

In another aspect, the air duct assembly further includes a second door coupled to at least one of the second and third ducts, with second door being movable between a closed position for blocking the flow of air into the common inlet and an open position for directing the flow of air from the blower motor into the common inlet.

In another aspect, the air duct assembly further includes a second actuator coupled to the second door for moving the second door between the closed and open positions.

In another aspect, the second duct includes a pair of opposing lateral sides facing one another, and the acoustic baffles include a plurality of panels arranged on the lateral sides to define the second passage along a serpentine path.

In another aspect, each of the panels includes a layer of acoustic foam.

In another aspect, the air duct assembly further includes a flexible tube disposed within the second duct and extending along the serpentine path. The flexible tube defines an interior passage having a first end fluidly connected to the common inlet and a second end fluidly connected to the common outlet, such that the interior passage flows air from the common inlet to the common outlet. The assembly further includes an acoustic insulation spaced from the interior passage and surrounding the flexible tube for absorbing the blower noise transmitted through a wall thickness of the flexible tube.

According to several aspects of the present disclosure, one example of an air distribution system for a motor vehicle is provided. The vehicle includes a windshield, a side glass disposed laterally outboard from the windshield, and a floor pan spaced vertically downward from the windshield. The air distribution system includes a blower motor for producing a flow of air and an associated blower noise. The system further includes an air duct assembly having a first duct that defines a first inlet fluidly connected to the blower motor and a first passage fluidly connected to the first inlet. The assembly further includes a second duct that defines a second passage separate from the first passage, with the first and second passages fluidly connected to a common outlet for flowing air to the windshield. The assembly further includes a third duct defining a third passage separate from the first and second passages, with the second and third passages fluidly connected to a common inlet for receiving air from the blower motor. The common inlet is separate from the first inlet, and the third passage is fluidly connected to a lateral outlet that is separate from the common outlet, with the lateral outlet flowing air to the side glass. The assembly further includes at least one acoustic baffle disposed within the second passage and configured to reduce a transmission of the blower noise through the second passage to the windshield. The assembly further includes a first door coupled to the first duct, with the first door being movable between a closed position for blocking the flow of air into the first inlet and an open position for directing the flow of air from the blower motor into the first inlet. The assembly further includes a first actuator coupled to the first door for moving the first door between the closed and open positions. The assembly further includes a second door coupled to at least one of the second and third ducts, with second door being movable between a closed position for blocking the flow of air into the common inlet and an open position for directing the flow of air from the blower motor into the common inlet. The assembly further includes a second actuator coupled to the second door for moving the second door between the closed and open positions. The air distribution system further includes a user interface having one or more input devices movable between a defrost mode, a side mode, and a combined defrost-side mode. The user interface is configured to generate a defrost signal, a side signal, and a combined defrost-side signal in response the input device being moved to an associated one of the defrost mode, the side mode, and the combined defrost-side mode. The system further includes a controller electrically coupled to the user interface, the first actuator, and the second actuator. The controller is configured to generate a defrost command signal, a side command signal, and a combined defrost-side command signal in response to the controller receiving an associated one of the defrost signal, the side signal, and the combined signal from the user interface. The second actuator receives the defrost command signal from the controller and moves the second door to the open position in response to the second actuator receiving the defrost command signal from the controller.

In one aspect, the first actuator receives the defrost command signal from the controller and moves the first door to the open position in response to the first actuator receiving the defrost command signal from the controller.

In another aspect, the first actuator receives the side command signal from the controller and moves the first door to the closed position in response to the first actuator receiving the side command signal from the controller.

In another aspect, the first actuator receives the combined defrost-side command signal from the controller and moves the first door to the open position in response to the first actuator receiving the combined defrost-side command signal from the controller.

In another aspect, the second actuator receives the side command signal from the controller and moves the second door to the open position in response to the second actuator receiving the defrost command signal from the controller.

In another aspect, the second actuator receives the combined defrost-side command signal from the controller and moves the second door to the open position in response to the second actuator receiving the defrost command signal from the controller.

In another aspect, the second duct includes a pair of opposing lateral sides facing one another, and the acoustic baffles include a plurality of panels arranged on the lateral sides to define the second passage along a serpentine path.

In another aspect, the air duct assembly further includes a flexible tube disposed within the second duct and extending along the serpentine path. The flexible tube defines an interior passage with a first end fluidly connected to the common inlet and a second end fluidly connected to the common outlet, such that the flexible tube flows air from the common inlet to the common outlet. The assembly further includes an acoustic insulation spaced from the interior passage and surrounding the flexible tube for absorbing the blower noise transmitted through a wall thickness of the flexible tube.

According to several aspects of the present disclosure, one example of a method for operating an air distribution system for a motor vehicle is provided. The motor vehicle includes a windshield, a side glass disposed laterally outboard from the windshield, and a floor pan spaced vertically downward from the windshield. The air distribution system includes a blower motor. The system further includes an air duct assembly having first, second, and third ducts that define an associated one of first, second, and third passages. The assembly further includes a common outlet associated with the first and second passages, a common inlet associated with the second and third passages, at least one acoustic baffle, a first door associated with the first passage, a first actuator coupled to the first door, a second door associated with the second and third passages, a second actuator coupled to the second door, a user interface having at least one input device, and a controller. The method includes the blower motor producing a flow of air and an associated blower noise. The input device of the user interface is moved to one of a defrost mode, a side mode, and a combined defrost-side mode. The user interface generates one of a defrost signal, a side signal, and a combined signal in response the input device being moved to an associated one of the defrost mode, the side mode and the combined defrost-side mode. The controller generates a defrost command signal, a side command signal, and a combined defrost-side command signal in response to the controller receiving an associated one of the defrost signal, the side signal, and the combined signal from the user interface. The first actuator moves the first door to an open position in response to the first actuator receiving the defrost command signal from the controller. The first passage and the blower motor are fluidly connected with another, in response to the first door being disposed in the open position. Air flows from the blower motor through a first inlet, the first passage, and the common outlet toward the windshield in response to the first door being disposed in the open position. The second actuator moves the second door to an open position, in response to the second actuator receiving one of the defrost command signal and the combined defrost-side command signal from the controller. The second and third passages are fluidly connected with the blower motor, in response to the second door being disposed in the open position. Air flows from the blower motor through the common inlet, the second passage, and the common outlet toward the windshield in response to the second door being disposed in the open position. The acoustic baffle reduces a transmission of the blower noise through the second passage to the windshield, in response to the second door being disposed in the open position. Air flows from the blower motor through the common inlet, the third passage, and a lateral outlet toward the side glass in response to the second door being disposed in the open position.

In one aspect, the method further includes using the at least one acoustic baffle arranged on a pair of opposing lateral sides of the second duct to flow air along a serpentine path.

In another aspect, the method further includes flowing air through a flexible tube disposed within the second duct and extending along the serpentine path. The flexible tube defines an interior passage with first and second ends fluidly connected to an associated one of the common inlet and common outlet for passing air through the interior passage. The blower noise is transmitted through a wall thickness of the flexible tube, and acoustic insulation, which is spaced from the interior passage and surrounds the flexible tube, absorbs the blower noise transmitted through the wall thickness of the flexible tube.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

Figure 1:
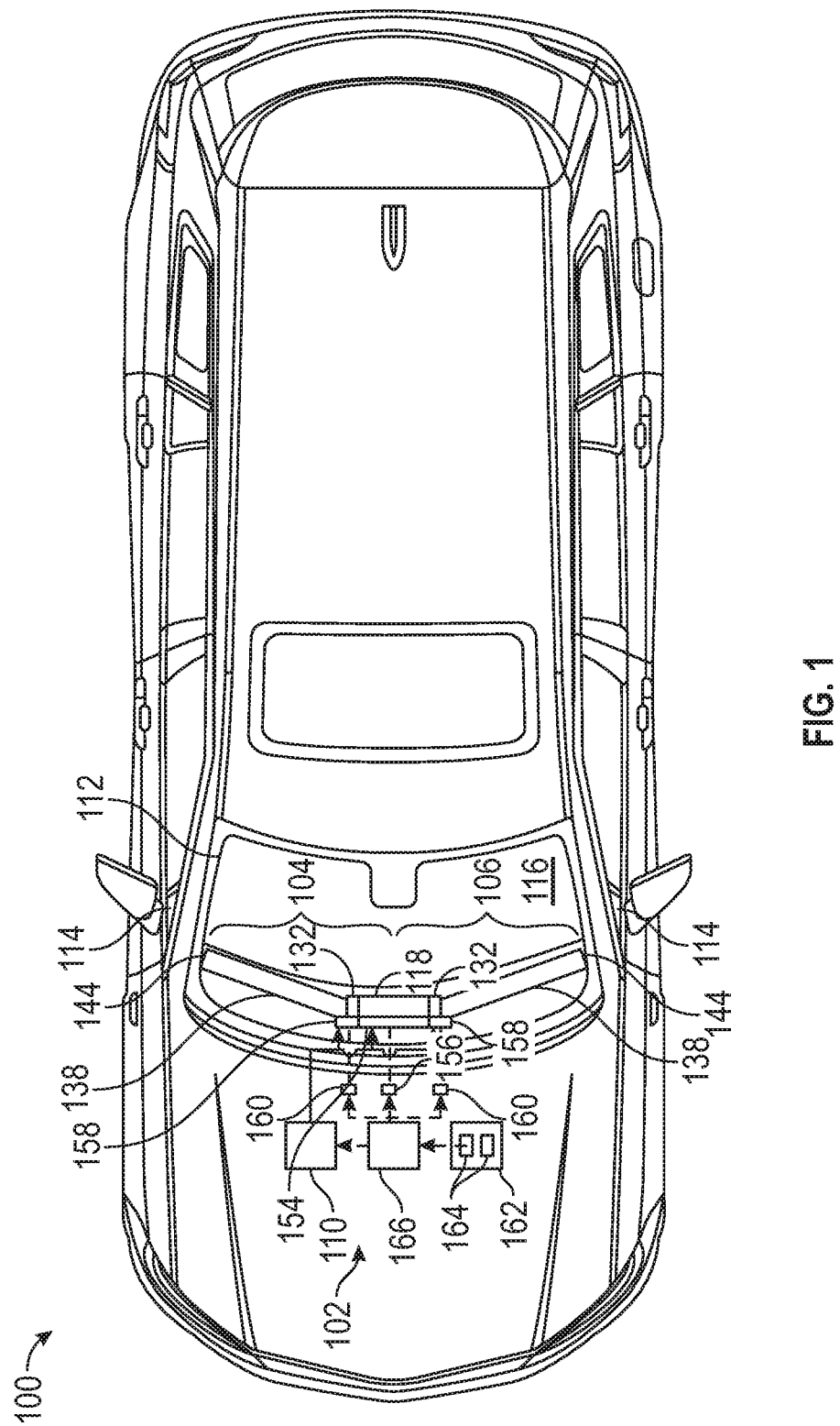
FIG. 1 is a schematic diagram of a motor vehicle having one example an air distribution system for diverting air between a windshield, a floor pan, and a side glass while reducing blower noise.

Referring to FIG. 1, a motor vehicle 100 includes one example of an air distribution system 102 having one or more air duct assemblies 104, 106 with at least one acoustic baffle 108 (FIGS. 2-4) for reducing a transmission of noise from a blower motor 110 (FIG. 2) to a windshield 112. The baffles 108 are tuned to absorb sound waves at a specific frequency and/or within a range of frequencies produced by the blower. In other examples, the baffles and ducts can be tuned to reduce a transmission of noise from any portion of the system to the windshield, a side glass, a floor pan, or any other section of the vehicle.

The motor vehicle 100 includes the windshield 112, a pair of side glass members 114 disposed laterally outboard from the windshield 112, and a floor pan 116 spaced vertically downward from the windshield 112. The air distribution system 102 includes the blower motor 110 for producing a flow of air and an associated blower noise. In this example, the air distribution system 102 includes first and second air duct assemblies 104, 106 that are left and righthand mirror structures. In other examples, the system 102 can include more or fewer than two of these assemblies that are identical or different from one another.

Figure 2:
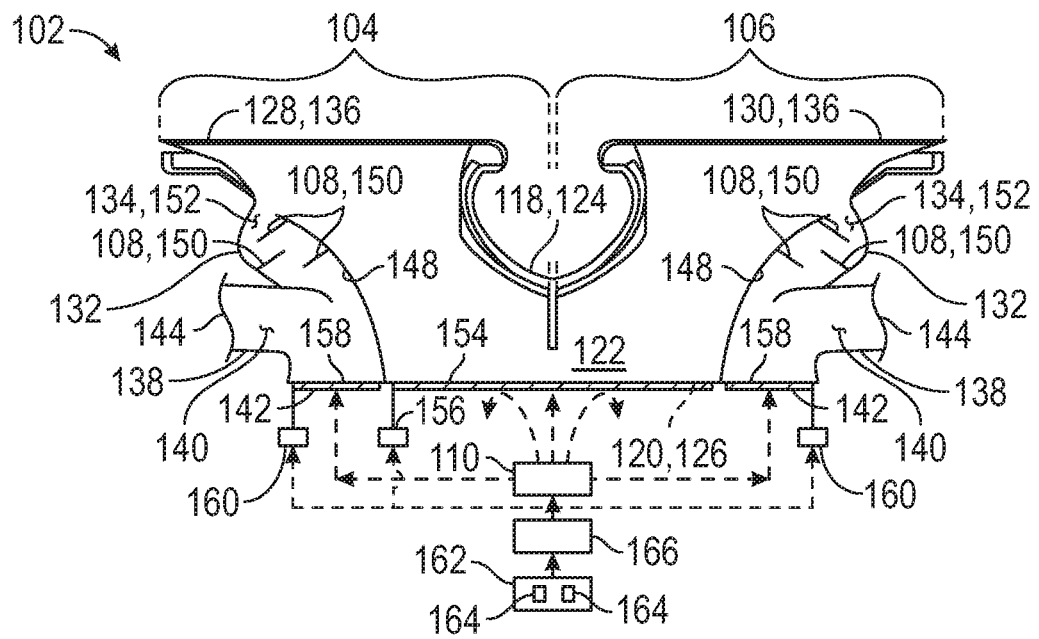
FIG. 2 is a schematic diagram of the air distribution system FIG. 1, illustrating the air distribution system having a plurality of doors disposed in a closed position for blocking a flow of air into the associated passages.
Figure 3:
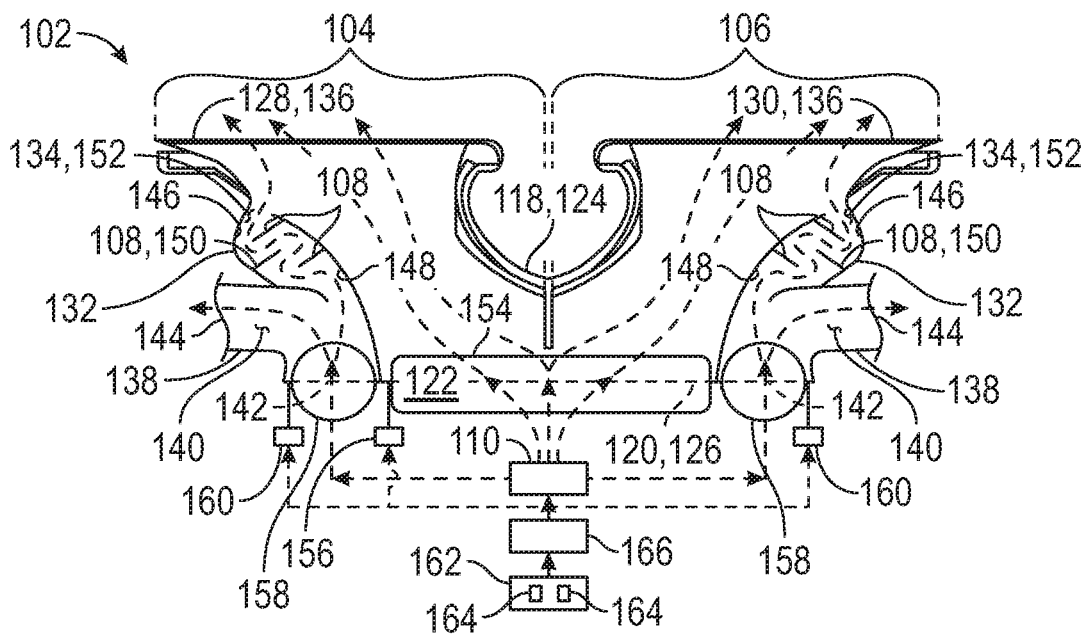
FIG. 3 is a schematic diagram of the air distribution system FIG. 2, illustrating each of the doors disposed in an open position for flowing air through the associated passages.
Figure 4:
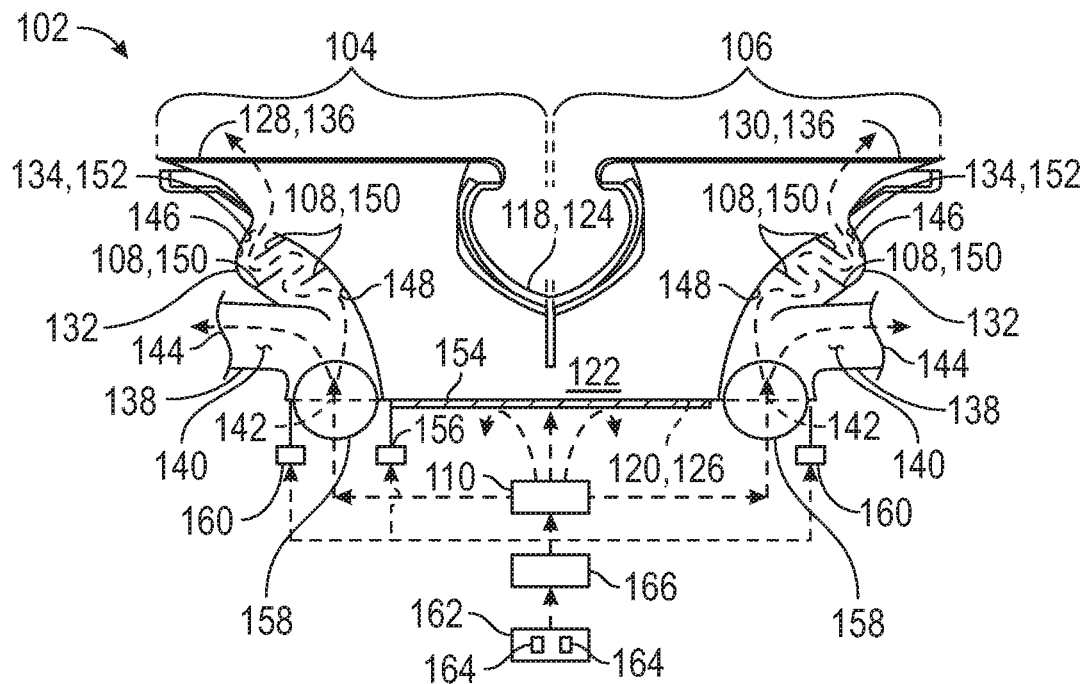
FIG. 4 is a schematic diagram of the air distribution system FIG. 3, illustrating one of doors disposed in the closed position and the other doors disposed in the open position for bleeding air through the associated passage where a plurality of baffles reduce the transmission of noise through the passage.

Referring to FIGS. 2-4, each of the air duct assemblies 104, 106 includes multiple ducts for supplying a flow of air to the windshield 112, the side glass member 114, and the floor pan 116 of the vehicle 100. Different combinations of these ducts have common inlets and common outlets. More specifically, the assemblies 104, 106 include a common first duct 118 defining a first inlet 120 fluidly connected to the blower motor 110 and a first passage 122 fluidly connected to the first inlet 120. Continuing with the previous example, the two assemblies 104, 106 include the first duct in the form of a single split duct 124 having one inlet 126 and two outlets 128, 130. Each air duct assembly 104, 106 further includes a second duct 132 defining a second passage 134 separate from the first passage 122, with the first and second passages 122, 134 fluidly connected to one or more common outlets 136 for flowing air to the windshield 112. The air duct assembly 104, 106 further includes a third duct 138 defining a third passage 140 separate from the first and second passages 122, 134, with the second and third passages 134, 140 fluidly connected to a common inlet 142 for receiving air from the blower motor 110. The common inlet 142 is separate from the first inlet 120. Furthermore, the third duct 138 is fluidly connected to a lateral outlet 144 that is separate from the common outlet 136, with the lateral outlet 144 flowing air to the side glass member 114.

The air duct assembly 104, 106 further includes at least one acoustic baffle 108 disposed within the second passage 134 and configured to reduce a transmission of the blower noise through the second passage 134 to the windshield 112. The second duct 132 includes a pair of opposing lateral sides 146, 148 facing one another, and the acoustic baffles 108 include a plurality of panels 150 arranged on the lateral sides 146, 148 to define the second passage 134 along a serpentine path 152. Each of the panels includes a layer of acoustic foam or other absorptive sound barrier configured to absorb the blower noise. However, in other examples, each panel may be a reflective sound barrier, such as a plastic panel without acoustic foam, such that the panel reflects the blower noise back upstream or in any other suitable direction.

The air duct assembly 104, 106 further includes a first door 154 coupled to the first duct 118, with the first door 154 being movable between a closed position (FIGS. 2 and 4) for blocking the flow of air into the first inlet 120 and an open position (FIG. 3) for directing the flow of air from the blower motor 110 into the first inlet 120. The air duct assembly 104, 106 further includes a first actuator 156 coupled to the first door 154 for moving the first door 154 between the closed and open positions.

Each air duct assembly 104, 106 further includes a second door 158 coupled to at least one of the associated second and third ducts 132, 138, with second door 158 being movable between a closed position (FIG. 2) for blocking the flow of air into the common inlet 142 and an open position (FIGS. 3 and 4) for directing the flow of air from the blower motor 110 into the common inlet 142. Each air duct assembly 104, 106 further includes a second actuator 160 coupled to the associated second door 158 for moving the second door 158 between the closed and open positions. However, in other examples, the first actuator may be coupled to the both of the first and second doors for moving the same between the closed and open positions. More specifically, in one example, a single actuator may include a linkage-cam system coupled to the first and second doors for moving the same between the closed and open positions. It is contemplated that the assembly can include any number of actuators having any suitable driving elements that move one or more of the doors.

The air distribution system 102 further includes a user interface 162 having one or more input devices 164 movable between a defrost mode, a side mode, and a combined defrost-side mode, with the user interface 162 configured to generate a defrost signal, a side signal, and a combined defrost-side signal, in response to a user moving the input device to an associated one of the defrost mode, the side mode, and the combined defrost-side mode.

The air distribution system 102 further includes a controller 166 electrically coupled to the user interface 162, the blower motor 110, the first actuator 156, and each of the second actuators 160. The controller 166 is configured to generate a defrost command signal, a side command signal, and a combined defrost-side command signal, in response to the controller 166 receiving an associated one of the defrost signal, the side signal, and the combined signal from the user interface 162.

The first actuator 156 receives the defrost command signal from the controller 166 and moves the first door 154 to the open position (FIG. 3), in response to the first actuator 156 receiving the defrost command signal from the controller 166. Furthermore, the first actuator 156 also receives the side command signal from the controller 166 and moves the first door 154 to the closed position (FIG. 2), in response to the first actuator 156 receiving the side command signal from the controller 166. In addition, the first actuator 156 receives the combined defrost-side command signal from the controller 166 and moves the first door 154 to the open position (FIG. 4), in response to the first actuator 156 receiving the combined defrost-side command signal from the controller 166.

The second actuators 160 receive the defrost command signal from the controller 166 and move the associated second doors 158 to the open position (FIG. 3), in response to the second actuators 160 receiving the defrost command signal from the controller 166. In addition, the second actuators 160 receive the side command signal from the controller 166 and move the associated second door 158 to the open position (FIG. 4), in response to the second actuators 160 receiving the side command signal from the controller 166. Furthermore, the second actuators 160 receive the combined defrost-side command signal from the controller 166 and move the associated second door 158 to the open position (FIG. 4), in response to the second actuators 160 receiving the defrost command signal from the controller 166.

Figure 5:
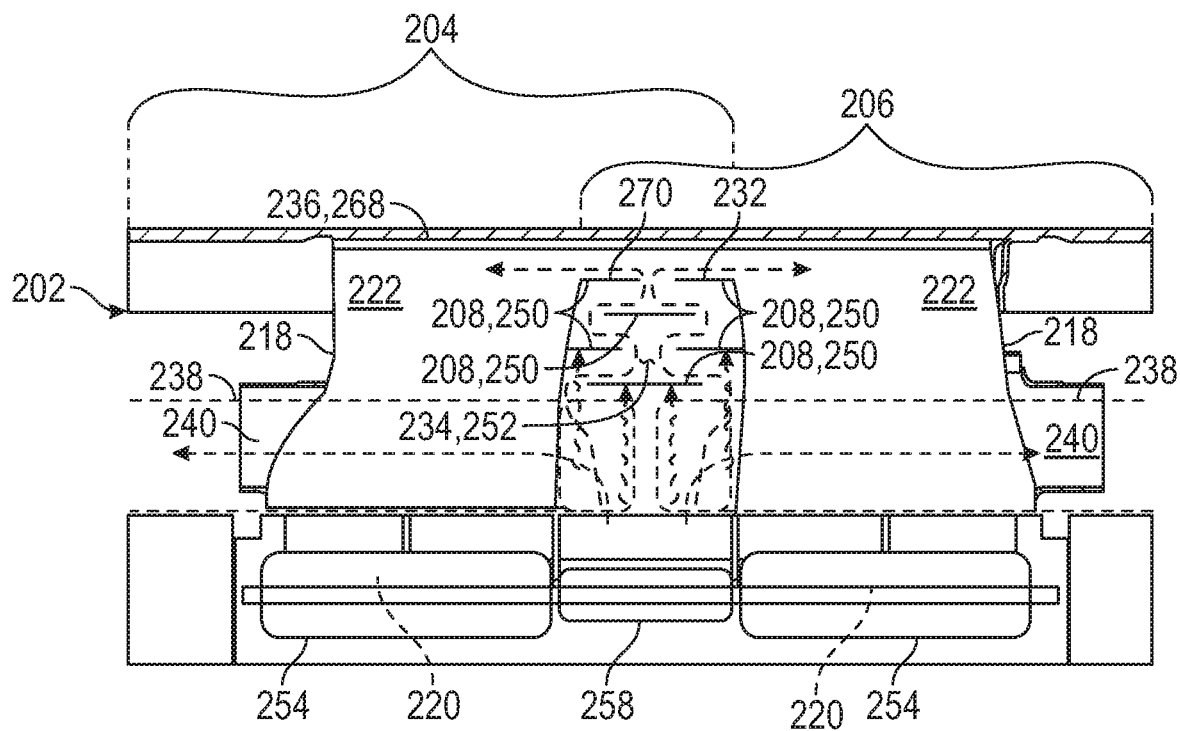
FIG. 5 is a cross-sectional view of another example of the air duct assembly of FIG. 1.

Referring to FIG. 5, another example of an air duct assembly 204, 206 is similar to the air duct assembly 104, 106 of FIG. 2 and includes similar components identified by the same reference numbers increased by 100. However, while the assembly 104, 106 of FIG. 2 includes the second duct 132 disposed adjacent to the first duct 118, the second duct 232 of FIG. 5 is disposed entirely within the first duct 218. Furthermore, the first and second ducts 218, 232 terminate at an associated one of outlet tips 268, 270. The outlet tip 270 of the second duct 232 is spaced from the outlet tip 268 of the first duct 218 and disposed upstream from the same, such that the second passage 134 is fluidly connected to the outlet tip 270 of the second duct 232, which is in turn fluidly connected to the first passage 222 that is in turn fluidly connected to the outlet tip 268 of the first duct 218. While the second duct is disposed within the first duct, it will be appreciated that second passage remains separate from the first passage such that flow of air in the associated passages do not mix until the flow exits the second duct. Also, in this example, the first duct 218 includes two inlets with an associated one of first doors 254, 258 movable between closed and open positions. Other examples of the assembly are contemplated, with the assembly having ducts disposed in any suitable arrangement for diverting air to any portion of the vehicle while reducing the transmission of noise from any portion of the system to the passenger cabin.

Figure 6:
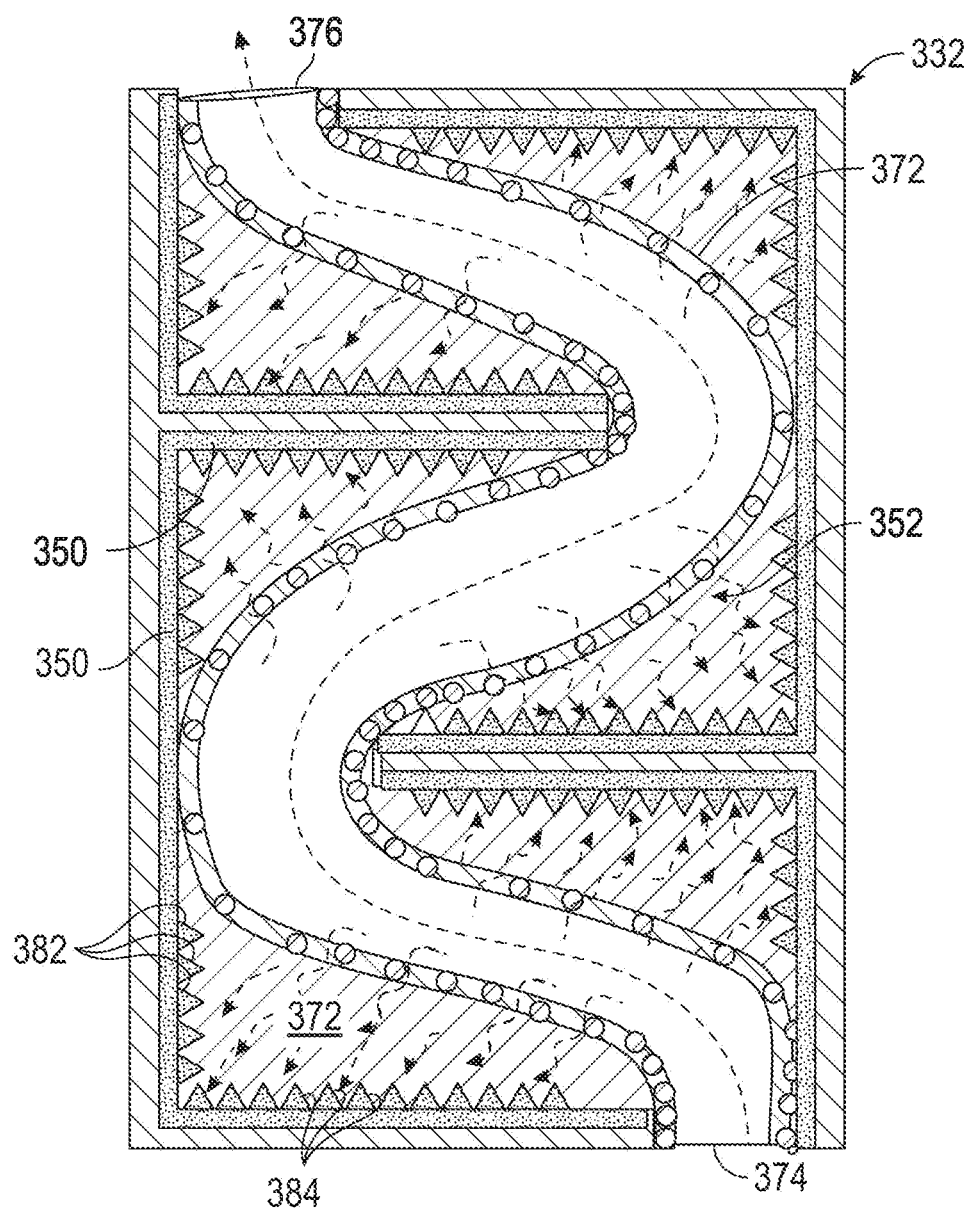
FIG. 6 is an enlarged cross-sectional view of another example of the baffles shown in FIG. 4.

Referring to FIG. 6, another example of a second duct 332 is similar to the second air duct 132 of FIG. 2 and includes similar components identified by the same reference numbers increased by 200. However, the second duct 332 further includes a flexible tube 372 disposed within the second duct 332 and extending along the serpentine path 352. The flexible tube 372 defines an interior passage having a first end 374 fluidly connected to the common inlet and a second end 376 fluidly connected to the common outlet, such that the interior passage flows air from the common inlet to the common outlet. In this example, the flexible tube 372 can include a single ply, PVC vinyl-coated polyester fabric sleeve with spring steel wire helix and external PVC wear strip. The tube 372 can further include PVC coated polyester fastening cuffs at both ends with spring buckle cinches (not shown). The fabric sleeve is made of flame retardant material. However, it is contemplated that this example of the second duct can include any suitable flexible tube. In addition, the second duct 332 also includes an acoustic insulation 378 spaced from the interior passage and surrounding the flexible tube 372 for absorbing the blower noise transmitted through a wall thickness of the flexible tube 372. Non-limiting examples of the acoustic insulation include fiberglass batting or composite, an acoustic panel made from recycled cotton fibers, polyurethane foam composite membrane, or other suitable materials. Because the acoustic insulation is spaced from the interior passage and the tube separates the insulation from the interior passage, it will be appreciated that no portion of the acoustic insulation is drawn into the flow of air. Furthermore, in this example, the acoustic foam panels 350 can include protrusions in the shape of cones 382 and pyramids 384. In other examples, the second duct may have any suitable combination of two or more of the panels, protrusions of any shape, insulation, and flexible tubing.

Figure 7:
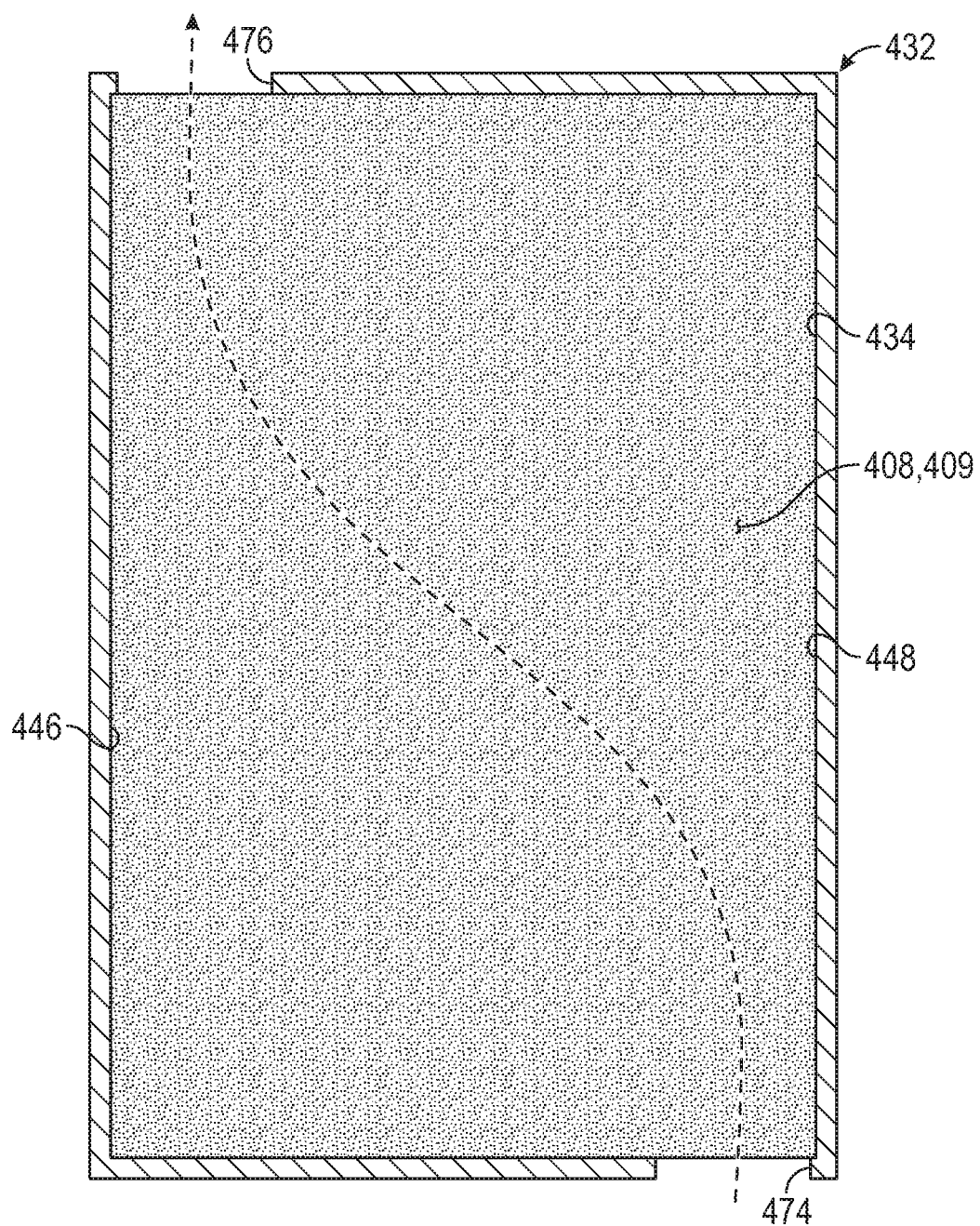
FIG. 7 is an enlarged cross-sectional view of yet another example of the baffle shown in FIG. 4.

Referring to FIG. 7, yet another example of a second duct 432 is similar to the second air duct 132 of FIG. 2 and includes similar components identified by the same reference numbers increased by 300. However, the second duct 432 shown in FIG. 7 does not one or more acoustic baffles 108 in the form of the panels 150 of FIG. 2 that define the serpentine path 152. The second duct 432 includes opposing lateral sides 446, 448 that define the second passage 434, with the baffle 408 being in the form of an acoustic foam 409 having a porous structure configured to pass the flow of air and absorb the blower noise. It is contemplated that the baffle can include any suitable material for absorbing and/or reflecting sound. Furthermore, the acoustic foam is disposed within at least a portion of the passage 434. In this example, the acoustic foam occupies the entire second passage 434 between the inlet 474 and the outlet 476. However, it is contemplated that the acoustic foam can occupy any one or more portions of the second passage 434 with or without panels defining a serpentine path.

Figure 8:
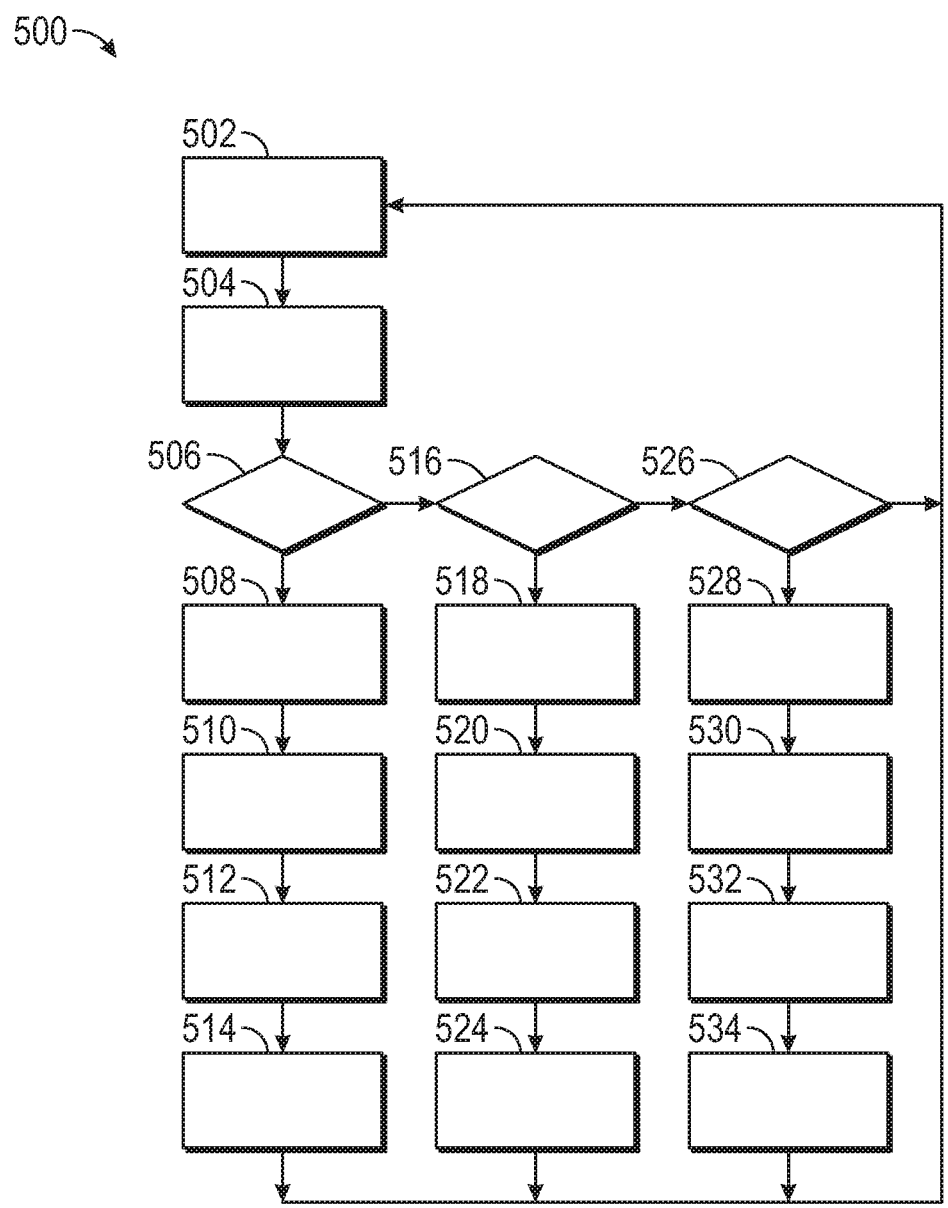
FIG. 8 is a flow chart for another example of a method for operating the enhanced imaging system of FIG. 1.

Referring to FIG. 8, a flow chart for one example of a method 500 for operating the air distribution system 102 of FIG. 1 is provided. The method 500 commences at block 502 with the blower motor 110 producing a flow of air and an associated blower noise.

At block 504, one or more input devices 164 of a user interface 162 moves to one of a defrost mode, a side mode, and a combined defrost-side mode.

At block 506, the user interface 162 determines whether the input device 164 was moved to the defrost mode. If the user interface 162 determines that the input device 164 was moved to the defrost mode, the user interface 162 generates the defrost signal, and the method proceeds to block 508. If the user interface 162 determines that the input device 164 was not moved to the defrost mode, the method proceeds to block 516.

At block 508, the controller 166 generates the defrost command signal, in response to the controller 166 receiving the defrost signal from the user interface 162.

At block 510, the first actuator 156 moves the first door 154 to the open position in response to the first actuator 156 receiving the defrost command signal from the controller 166. In addition, the second actuator 160 moves the second door 158 to the open position, in response to the second actuator 160 receiving the defrost command signal from the controller 166.

At block 512, the first duct and the blower motor are fluidly connected with another, in response to the first door being disposed in the open position. The second duct 132 and the third duct 138 are fluidly connected with the blower motor 110, in response to the second door 158 being disposed in the open position.

At block 514, air passes from the blower motor 110 through the first inlet 120, the first passage 122, and the common outlet 136 toward the windshield 112, in response to the first door 154 being disposed in the open position. In addition, air passes from the blower motor 110 through the common inlet 142, the second passage 134, and the common outlet 136 toward the windshield 112 in response to the second door 158 being disposed in the open position. The acoustic baffles 108 are absorptive sound barriers configured to absorb sound and reduce transmission of the blower noise through the second passage 134 to the windshield 112, in response to the second door 158 being disposed in the open position. In other examples, the acoustic baffles can be reflective sound barriers configured to reflect sound and reduce transmission of the blower noise through the second passage to the windshield. The air passes along the serpentine path 152 defined by the acoustic baffles 108 arranged on the opposing lateral sides 146, 148 of the second duct 132.

In another example of the method, block 514 further includes passing air through the flexible tube 372 of FIG. 6 disposed within the second duct 332 and extending along the serpentine path 352. The blower noise is transmitted through the wall thickness of the flexible tube 372, such that fiberglass insulation disposed within the second duct and surrounding the flexible tube, absorbs the blower noise. Furthermore, air passes from the blower motor 110 through the common inlet 142, the third duct 138, and the lateral outlet 144 toward the side glass member 114 in response to the second door 158 being disposed in the open position.

At block 516, the user interface 162 determines whether the input device 164 was moved to the side mode. If the user interface 162 determines that the input device 164 was moved to the side mode, the user interface 162 generates the side signal, and the method proceeds to block 518. If the user interface 162 determines that the input device 164 was not moved to the side mode, the method proceeds to block 526.

At block 518, the controller 166 generates the side command signal, in response to the controller receiving the side signal from the user interface 162.

At block 520, the first actuator 156 moves the first door 154 to the closed position in response to the first actuator 156 receiving the side command signal from the controller 166. In addition, the second actuator 160 moves the second door 158 to the open position, in response to the second actuator 160 receiving the side command signal from the controller 166. The system can further include a floor duct (not shown) having a floor door (not shown) and a floor actuator (not shown) for moving the floor door between open and closed positions. The floor actuator can move the floor door to the open position in response to the floor actuator receiving a floor command signal from the controller 166.

At block 522, the first duct 118 and the blower motor 110 are not fluidly connected with another, in response to the first door 154 being disposed in the closed position for blocking the first inlet. The second duct 132 and the third duct 138 are fluidly connected with the blower motor 110, in response to the second door 158 being disposed in the open position.

At block 524, air does not pass from the blower motor 110 through the first inlet 120, the first passage 122, and the common outlet 136 toward the windshield 112, in response to the first door 154 being disposed in the closed position because the first door 154 is blocking flow through the first inlet 120. However, air passes from the blower motor 110 through the common inlet 142, the second passage 134, and the common outlet 136 toward the windshield 112, in response to the second door 158 being disposed in the open position. The acoustic baffles 108 reduce a transmission of the blower noise through the second passage 134 to the windshield 112, in response to the second door 158 being disposed in the open position. The air passes along a serpentine path 152 defined by the acoustic baffles 108 arranged on the opposing lateral sides 146, 148 of the second duct 132.

At block 526, the user interface 162 determines whether the input device 164 was moved to the combined defrost-side mode. If the user interface 162 determines that the input device 164 was moved to the combined defrost-side mode, the user interface 162 generates the combined defrost-side signal, and the method proceeds to block 528. If the user interface 162 determines that the input device 164 was not moved to the combined defrost-side mode, the method returns to block 502.

At block 528, the controller 166 generates the combined defrost-side command signal, in response to the controller 166 receiving the combined defrost-side signal from the user interface 162.

At block 530, the first actuator 156 moves the first door 154 to the open position, in response to the first actuator 156 receiving the combined defrost-side command signal from the controller 166. In addition, the second actuator 160 moves the second door 158 to the open position, in response to the second actuator 160 receiving the combined defrost-side command signal from the controller 166. The floor actuator can move the floor door to the open position in response to the floor actuator receiving the combined defrost-side command signal from the controller 166.

At block 532, the first duct 118 and the blower motor 110 are fluidly connected with another, in response to the first door 154 being disposed in the open position. The second duct 132 and the third duct 138 are fluidly connected with the blower motor 110, in response to the second door 158 being disposed in the open position.

At block 534, air passes from the blower motor 110 through the first inlet 120, the first passage 122, and the common outlet 136 toward the windshield 112, in response to the first door 154 being disposed in the open position. In addition, air passes from the blower motor 110 through the common inlet 142, the second passage 134, and the common outlet 136 toward the windshield 112, in response to the second door being disposed in the open position. The acoustic baffles 108 reduce a transmission of the blower noise through the second passage 134 to the windshield 112, in response to the second door 158 being disposed in the open position. The air passes along a serpentine path 152 defined by the acoustic baffles 108 arranged on the opposing lateral sides 146, 148 of the second duct 132.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. An air duct assembly of an air distribution system for a motor vehicle having a windshield, a side glass disposed laterally outboard from the windshield, and a floor pan spaced vertically downward from the windshield, with the air distribution system having a blower motor for producing a flow of air and an associated blower noise, and the air duct assembly comprising:
   a first duct defining a first passage;
   a second duct defining a second passage separate from the first passage, with the first and second passages fluidly connected to at least one common outlet, such that air flows through the first and second passages and through the at least one common outlet to the windshield;
   a third duct defining a third passage separate from the first and second passages, with the second and third passages arranged to receive airflow in parallel from a common inlet and receiving air from the blower motor, and the third passage is fluidly connected to a lateral outlet that is separate from the common outlet, with the lateral outlet flowing air to the side glass; and
   at least one acoustic baffle disposed within the second passage and configured to reduce a transmission of the blower noise through the second passage to the windshield; and wherein the first duct has a first inlet fluidly communicating with the blower motor, with the first inlet being separate from the common inlet.

2. The air duct assembly of claim 1 further comprising a first door coupled to the first duct, with the first door being movable between a closed position for blocking the flow of air into the first inlet and an open position for directing the flow of air from the blower motor into the first inlet.

3. The air duct assembly of claim 2 further comprising a first actuator coupled to the first door for moving the first door between the closed and open positions.

4. The air duct assembly of claim 3 further comprising a second door coupled to at least one of the second and third ducts, with second door being movable between a closed position for blocking the flow of air into the common inlet and an open position for directing the flow of air from the blower motor into the common inlet.

5. The air duct assembly of claim 4 further comprising a second actuator coupled to the second door for moving the second door between the closed and open positions.

6. The air duct assembly of claim 5 wherein the second duct includes a pair of opposing lateral sides facing one another, and the at least one acoustic baffle includes a plurality of panels arranged on the lateral sides to define the second passage along a serpentine path.

7. The air duct assembly of claim 6 wherein each of the panels includes a layer of acoustic foam.

8. The air distribution system of claim 7 wherein the air duct assembly further comprises:
   a flexible tube disposed within the second duct and extending along the serpentine path, with the flexible tube defining an interior passage with a first end fluidly connected to the common inlet and a second end fluidly connected to the common outlet, such that the interior passage flows air from the common inlet to the common outlet; and
   an acoustic insulation disposed within the second duct, with the acoustic insulation spaced from the interior passage and surrounding the flexible tube for absorbing the blower noise transmitted through a wall thickness of the flexible tube.

9. The air duct assembly of claim 5 wherein the at least one acoustic baffle is comprised of an acoustic foam disposed within the second passage and having a porous structure for passing the flow of air therethrough and absorbing the blower noise.

10. An air distribution system for a motor vehicle having a windshield, a side glass disposed laterally outboard from the windshield, and a floor pan spaced vertically downward from the windshield, and the air distribution system comprising:
    a blower motor for producing a flow of air and an associated blower noise;
    an air duct assembly comprising:
       a first duct defining a first inlet fluidly connected to the blower motor and a first passage fluidly connected to the first inlet;
       a second duct defining a second passage separate from the first passage, with the first and second passages fluidly connected to a common outlet, such that air flows through the first and second passages and through the at least one common outlet to the windshield;
       a third duct defining a third passage separate from the first and second passages, with the second and third passages arranged to receive airflow in parallel from a common inlet and receiving air from the blower motor, with the common inlet separate from the first inlet, and the third passage is fluidly connected to a lateral outlet that is separate from the common outlet, with the lateral outlet flowing air to the side glass; and
       at least one acoustic baffle disposed within the second passage and configured to reduce a transmission of the blower noise through the second passage to the windshield;
       a first door coupled to the first duct, with the first door being movable between a closed position for blocking the flow of air into the first inlet and an open position for directing the flow of air from the blower motor into the first inlet;
       a first actuator coupled to the first door for moving the first door between the closed and open positions;
       a second door coupled to at least one of the second and third ducts, with second door being movable between a closed position for blocking the flow of air into the common inlet and an open position for directing the flow of air from the blower motor into the common inlet;
       a second actuator coupled to the second door for moving the second door between the closed and open positions;
    a user interface having at least one input device movable between a defrost mode, a side mode, and a combined defrost-side mode, with the user interface configured to generate a defrost signal, a side signal, and a combined defrost-side signal in response the input device being moved to an associated one of the defrost mode, the side mode, and the combined defrost-side mode; and a controller electrically coupled to the user interface, the first actuator, and the second actuator, with the controller configured to generate a defrost command signal, a side command signal, and a combined defrost-side command signal in response to the controller receiving an associated one of the defrost signal, the side signal, and the combined signal from the user interface;

wherein the second actuator receives the defrost command signal from the controller and moves the second door to the open position in response to the second actuator receiving the defrost command signal from the controller.

11. The air distribution system of claim 10 wherein the first actuator receives the defrost command signal from the controller and moves the first door to the open position in response to the first actuator receiving the defrost command signal from the controller.

12. The air distribution system of claim 11 wherein the first actuator receives the side command signal from the controller and moves the first door to the closed position in response to the first actuator receiving the side command signal from the controller.

13. The air distribution system of claim 12 wherein the first actuator receives the combined defrost-side command signal from the controller and moves the first door to the open position in response to the first actuator receiving the combined defrost-side command signal from the controller.

14. The air distribution system of claim 13 wherein the second actuator receives the side command signal from the controller and moves the second door to the open position in response to the second actuator receiving the defrost command signal from the controller.

15. The air distribution system of claim 14 wherein the second actuator receives the combined defrost-side command signal from the controller and moves the second door to the open position in response to the second actuator receiving the defrost-command signal from the controller.

16. The air distribution system of claim 15 wherein the second duct includes a pair of opposing lateral sides facing one another and the at least one acoustic baffle includes a plurality of panels arranged on the lateral sides to define the second passage along a serpentine path.

17. A method of operating an air distribution system for a motor vehicle having a windshield, a side glass disposed laterally outboard from the windshield, and a side glass disposed laterally outboard from the windshield, with the air distribution system including a blower motor, with the air distribution system further including an air duct assembly having first, second, and third ducts that define an associated one of first, second, and third passages, with the second and third passages receiving airflow in parallel with one another, the assembly further including a common outlet associated with the first and second passages, a common inlet associated with the second and third passages, at least one acoustic baffle, a first door associated with the first passage, a first actuator coupled to the first door, a second door associated with the second and third passages, a second actuator coupled to the second door, a user interface having at least one input device, and a controller, the method comprising:

producing, using the blower motor, a flow of air and an associated blower noise;

moving at least one input device of a user interface to one of a defrost mode, a side mode, and a combined defrost-side mode;

generating, using the user interface, one of a defrost signal, a side signal, and a combined signal in response the input device being moved to an associated one of the defrost mode, the side mode and the combined defrost-side mode;

generating, with the controller, a defrost command signal, a side command signal, and a combined defrost-side command signal in response to the controller receiving an associated one of the defrost signal, the side signal, and the combined signal from the user interface;

moving, using the first actuator, the first door to an open position in response to the first actuator receiving the defrost command signal from the controller;

fluidly connecting the first duct and the blower motor with one another, in response to the first door being disposed in the open position;

passing air from the blower motor through a first inlet, the first passage, and the common outlet toward the windshield in response to the first door being disposed in the open position;

moving, using the second actuator, the second door to an open position, in response to the second actuator receiving one of the side command signal and the combined defrost-side command signal from the controller;

fluidly connecting the second duct and the third duct with the blower motor, in response to the second door being disposed in the open position;

passing air from the blower motor through the common inlet, the second passage, and the common outlet toward the windshield in response to the second door being disposed in the open position;

reducing, using the at least one acoustic baffle, a transmission of the blower noise through the second passage to the windshield, in response to the second door being disposed in the open position; and passing air from the blower motor through the common inlet, the third passage, and a lateral outlet toward the side glass in response to the second door being disposed in the open position.

18. The method of claim 17 further comprising passing air along a serpentine path, using the at least one acoustic baffle arranged on a pair of opposing lateral sides of the second duct.

19. The method of claim 18 further comprising:

passing air through a flexible tube disposed within the second duct and extending along the serpentine path;

transmitting the blower noise through a wall thickness of the flexible tube; and absorbing, using an acoustic insulation spaced from the interior passage and surrounding the flexible tube, the blower noise transmitted through the wall thickness of the flexible tube.

\* \* \* \* \*